Patented Oct. 17, 1922.

1,432,699

UNITED STATES PATENT OFFICE.

PHILIP G. KINZER, OF SEATTLE, WASHINGTON, ASSIGNOR, BY MESNE ASSIGNMENTS, TO CARNATION MILK PRODUCTS COMPANY, OF CHICAGO, ILLINOIS, A CORPORATION OF DELAWARE.

MILK PRODUCT AND PROCESS OF MAKING IT.

No Drawing.    Application filed March 6, 1918. Serial No. 220,766.

*To all whom it may concern:*

Be it known that I, PHILIP G. KINZER, a citizen of the United States, and a resident of Seattle, in the county of King and State of Washington, have invented certain new and useful Improvements in Milk Products and Processes of Making Them, of which the following is a specification.

This invention relates to milk products and processes of making them, and has for its object to provide a product of wholesomeness, and relatively inexpensive, and to provide an improved process to be hereinafter set forth.

In the carrying out of my process, I take fresh milk and warm it to a temperature of 80° to 90° F., and then separate out the cream. This separation takes place while the milk is warm, and by a centrifugal action, whereby the cream is separated, and the cholesterol of the whole milk instead of separating out entirely with the cream, stays back and forms part of the skimmed milk, though, of course, a part goes along with the cream. This skimmed milk contains about .05% to 0.10% milk fat, and the cream 30 to 35%. The cream is then pasteurized, cooled and churned without ripening, thus producing by the butter fat resulting from the cream an excellent butter as a by-product, which may be commercially utilized. As a result of this churning, the cream, as stated, is churned into butter fat, but there remains in the churn, the separated liquid, namely, the buttermilk. This buttermilk is practically skim milk. This buttermilk contains about 0.10% milk fat, and due to the churning, it also contains cholesterol which again, goes with the skim milk or buttermilk, so called, though, of course, some goes with the butter fat, which is churned out.

Due to warming in the process of skimming or separating, the milk in the cream undergoes some enzyme action which increases its contents of albuminoids to a point much above the amount contained in other skim milk. Fermentative action in the cream, due to proteolytic enzymes always present in the milk, splits a certain quantity of the casein into more soluble proteins of albuminoid character.

The fresh or sweet buttermilk referred to is then returned to the skim milk and mixed with it, and thereupon a substituted fat is added, and then emulsification is carried out. This substituted fat is preferably cocoanut oil substantially free from free fatty acids, that is an edible cocoanut oil. This emulsification may be carried out by mixing in a forewarmer with the action of steam, or the milk might be concentrated and then the substituted fat added in an aspirator, or other processes may be used. I prefer the first mentioned, namely, what is known as the "Hebe" process.

The albuminoid content of the buttermilk increases its emulsifying power and has a beneficial effect on the emulsification and on the stability and flavor of the finished product, as long as the proportion of albuminoids is kept within certain limits, that is, the coagulability, due to the buttermilk, must not reach a point where it interferes with sterilizing, but should be only sufficient to assist in emulsification in the forewarmers. In practice, the addition of buttermilk does not normally interfere in sterilizing, but serves only to add and utilize the milk solids which it contains, and to increase the emulsifying power of the skim milk by addition of more albuminoids coagulable in forewarming.

Edible cocoanut oil has phytosterol, has emulsifying properties, and this alcohol phytosterol combines with the cholesterol during the process, and the cholesterol being an emulsifying agent is also present in almost all animal fats. It acts also as a growth producing agent or a growth producing factor carrier, while phytosterol has similar properties.

The churning in the churn brings about a constant washing of the buttermilk and butter or milk fat, so that the buttermilk probably absorbs some of the growth producing properties of the milk fat or butter fat, though leaving some in the butter fat to assist its wholesomeness and growth producing properties. That portion that remains in the butter fat or butter is compensated for in the compound by the phytosterol in the cocoanut oil.

At the same time, the buttermilk which is not the usual buttermilk, but is that as results from churning a superior quality of cream, may be utilized since it is now disposed of at very little cost, or allowed to go to waste. It is to be specially noted that the buttermilk is that derived from churning a superior quality of cream, and not what is usually called buttermilk one in which undesirable fermentations have taken place. It is, indeed, substantially like the other skimmed milk obtained by the above separation, excepting that it continually washes in the churn against the churned out butter fat with the consequent solving of the growth producing elements.

It is clear, therefore, that by the steps described, I obtain a product that has all the attributes of whole milk in wholesomeness and growth producing properties.

Another form of invention consists also in adding the buttermilk referred to, immediately as it comes out of the churn, to cocoanut oil free from free fatty acids, that is an edible cocoanut oil, to absorb the growth producing factors of the buttermilk immediately, and then adding this mixture to the main portion of the skimmed milk coming from the separator, and then making a stable emulsion in accordance with the processes referred to.

Another form of my invention also embraces the use of fresh sweet buttermilk in the manufacture of a butter substitute and in this the fresh sweet buttermilk as it comes from the churn used in the making of fresh sweet butter, is mixed by a mixer into an intimate emulsion, with the cocoanut fat substantially free from free fatty acids, and by this emulsion the solids of the buttermilk will combine with the said cocoanut fat. Thereafter, the emulsion is agitated by suitable apparatus to remove the free water, whereby the resulting cocoanut butter free from free fatty acids holds in intimate admixture the valuable solids of the buttermilk and having absorbed the growth producing factors of the buttermilk, the resulting churned cocoanut butter free from free fatty acids and buttermilk solids form a valuable butter substitute. I have invented therefore, among other things, the step in the art of immediately mixing the fresh sweet buttermilk with cocoanut butter free from free fatty acids, and its utilization in the subsequent manufacture of a milk compound, or butter substitute, or similar purposes.

My process has the advantage in that it provides for the utilization of the buttermilk, and also in that it gives a very satisfactory end product having important growth producing factors inherent therein.

I have described various phases of my invention to enable those skilled in the art to understand same, and it is clear that in the specific process described as the embodiment of my invention, changes may be made without departing from the spirit of my invention and defined in the appended claims. The product itself is characterized by the description made thereof and by the appended claims.

I claim as new and desire to secure by Letters Patent:

1. The process herein described which consists in separating the cream from fresh whole cow's milk, then churning the cream to separate the butter fat, and then mixing the skim milk of the first separation and the buttermilk or skim milk of the second separation with an edible vegetable fat.

2. The process herein described which consists in separating the cream from fresh whole cow's milk, then churning the cream to separate the butter fat, and then mixing the skim milk of the first separation and the buttermilk or skim milk of the second separation with an edible vegetable fat, and then combining the constituents of the mixture to a stable emulsion.

3. The process herein described which consists in separating the cream from fresh whole cow's milk, then churning the cream to separate the butter fat, and then mixing the skim milk of the first separation and the buttermilk or skim milk of the second separation with an edible vegetable fat, and combining the constituents of the mixture to a stable emulsion, free from free fatty acids.

4. The product which consists in skim milk, fresh buttermilk solids, and a vegetable fat free from free fatty acids in which the skim milk is the major portion and the buttermilk the minor portion, combined in stable emulsion form with the vegetable fat.

5. The process herein described which consists in separating the cream from fresh whole cow's milk to form skim milk containing its growth-producing substances, then churning the cream to separate the butter fat to form buttermilk containing its growth-producing substances, and then mixing the skim milk of the first separation and the buttermilk of the second separation with an edible vegetable fat free from fatty acids for absorbing in the edible vegetable fat the growth-producing substances referred to, and then combining the constituents of the mixture to a stable emulsion free from free fatty acids.

6. The product herein described, which consists of skim milk, fresh buttermilk and a substituted edible vegetable fat free from free fatty acids, all combined to stable emulsion form, the growth-producing factors of the skim milk and fresh buttermilk being absorbed by the substituted fat, and thereby permanently combined in the milk.

In testimony that I claim the foregoing as my invention, I have signed my name in presence of two subscribing witnesses.

PHILIP G. KINZER.

Witnesses:
M. SPENCER,
E. H. STUART.